United States Patent
Kim

(10) Patent No.: US 6,254,175 B1
(45) Date of Patent: Jul. 3, 2001

(54) AIR VENT SYSTEM FOR DOOR OF AUTOMOBILE

(75) Inventor: Byung-Yoon Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/709,681

(22) Filed: Nov. 9, 2000

(30) Foreign Application Priority Data

Dec. 28, 1999 (KR) .................................................. 99-64678

(51) Int. Cl.$^7$ ....................................................... B60J 5/04
(52) U.S. Cl. ........................ 296/208; 296/146.7; 454/124
(58) Field of Search ................. 296/208, 146.9, 296/152, 146.5, 146.7; 454/124, 152

(56) References Cited

U.S. PATENT DOCUMENTS 2,523,923 * 9/1950 Rodert .
3,602,126 * 8/1971 Breitschwerdt .
4,173,174 * 11/1979 Vinko et al. .
4,709,957 * 12/1987 Ohya .
4,783,115 * 11/1988 Galubensky et al. .

* cited by examiner

*Primary Examiner*—Joseph D. Pape
(74) *Attorney, Agent, or Firm*—Christie, Parker & Hale, LLP

(57) ABSTRACT

The invention relates to an air vent system for a door of an automobile to allow a passenger to avoid undesired exposure to air by completely blocking an air duct, the system constructed with a door duct installed at a door with an inlet that is to be tightly aligned to a duct of a crush pad when the door is closed and an outlet formed to a predetermined direction of the door and control apparatus installed in the front side of the door duct to control an air exhausting direction, the system comprising: a damper arranged in the center of the door duct for opening and closing the door duct at the time of rotations; a damper knob coupled with a rotary axis at an edge of the door duct to be rotated; and links connecting damper and damper knob which is rotated to allow the damper to open and close the door duct.

4 Claims, 4 Drawing Sheets

AIR VENT SYSTEM FOR DOOR OF AUTOMOBILE

BACKGROUND OF THE INVENTION

1. Field of the Invention

The present invention relates to an air vent system and more particularly to an air vent system installed at a door of an automobile.

2. Description of the Prior Art

In general, there is an air conditioning apparatus for circulating and purifying room air in an automobile.

The air conditioning apparatus includes a blower assembly for absorbing and exhausting room air out, an air duct formed to allow air to be supplied from the blower assembly and to be exhausted at a plurality of parts of crush pad and floor and a defroster.

Particularly, the air passing through the air duct is to be further supplied to an opening and closing part, a door. As shown in FIGS. 6 and 7, an air vent system includes a door duct 52 installed with an inlet 50 at the upper end of a door trim T for being closely aligned with a duct (not shown) of a crush pad C when a door is closed and an outlet close to the door trim T and a tightening pad 53 positioned at the inlet 50 to be tightly attached to the crush pad C.

Also, control means is assembled near the outlet 51 of the door duct 52 for controlling an air exhausting direction. The control means includes a grill 54 mounted at the outlet 51 to make vertical rotations, a plurality of blades 55 to make horizontal rotations toward the grill 54, a grill handle 56 mounted to rotate the blades 55 and a horizontal handle 57.

If the door is closed, the tightening pad 53 of the inlet 50 is tightly attached to the crush pad C and air is supplied to the door duct 52 through the duct of the crush pad C.

The air supplied to the door duct is then exhausted out through the grill 54 and blades 55 in a predetermined direction.

However, there is a problem in the conventional air vent system in that, when air is exhausted through the door duct installed at the door as described above, it is possible to move the blades and grill to control the air exhausting direction, but impossible to completely block the air duct and to avoid being exposed to the air exhausting out.

SUMMARY OF THE INVENTION

The present invention is disclosed to solve the aforementioned problems and it is an object of the present invention to provide an air vent system for a door of an automobile to allow a passenger to avoid undesired exposure to the air by completely blocking the air duct.

In order to accomplish the aforementioned objects of the present invention, there is provided an air vent system for a door of an automobile having a door duct installed at a door with an inlet that is to be tightly aligned to a duct of a crush pad when the door is closed and an outlet formed to a predetermined direction of the door and control means installed in a front side of the door duct to control an air exhausting direction, the system comprising:

a damper arranged in the center of the door duct for opening and closing the door duct at the time of its rotations;

a damper knob coupled with a rotary axis at an edge of the door duct to be rotated; and link means connecting damper and damper knob which is rotated to allow the damper to open and close the door duct.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Objects and aspects of the invention will become apparent from the following detailed description of preferred embodiments with reference to the accompanying drawings.

Figure 1:
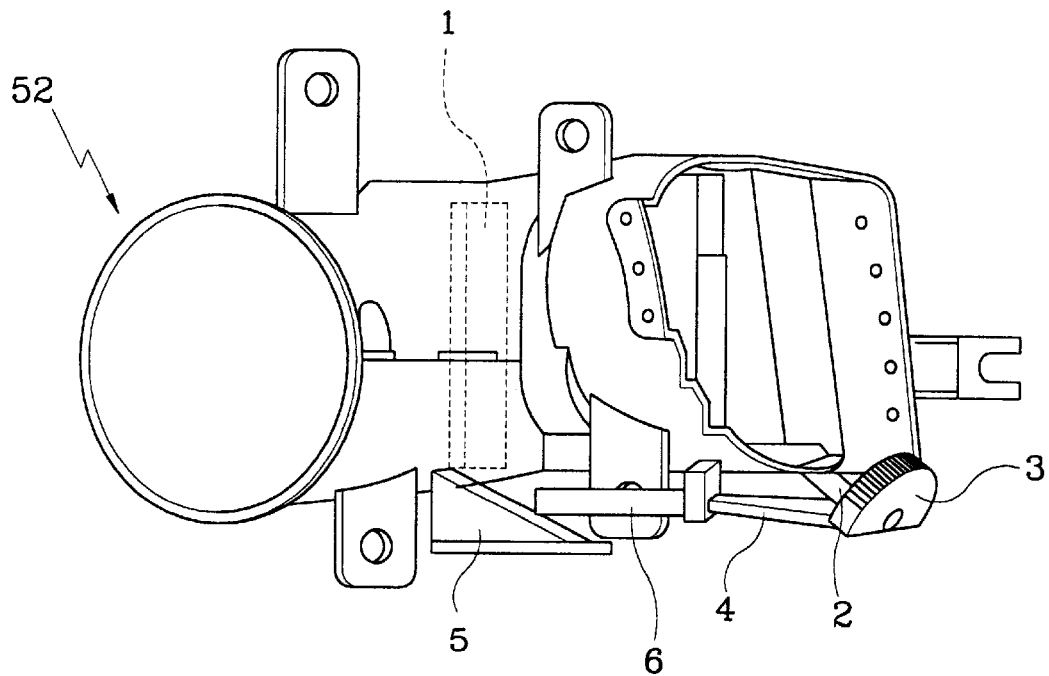
FIG. 1 is a cross-sectional view for illustrating installation of damping means in the air vent system of a door of an automobile in accordance with the present invention.
Figure 2:
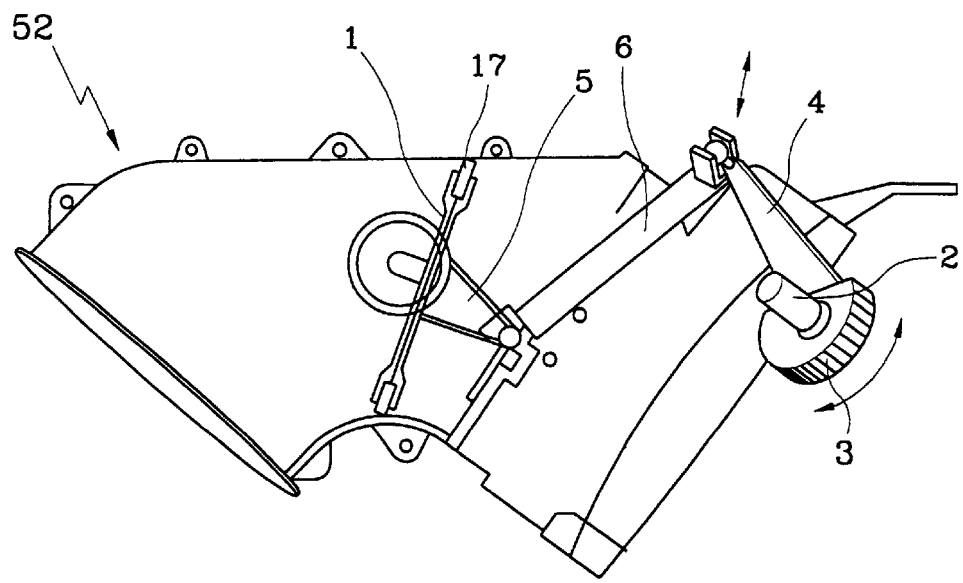
FIG. 2 is a plane and cross-sectional view of the damping means shown in FIG. 1.
Figure 3:
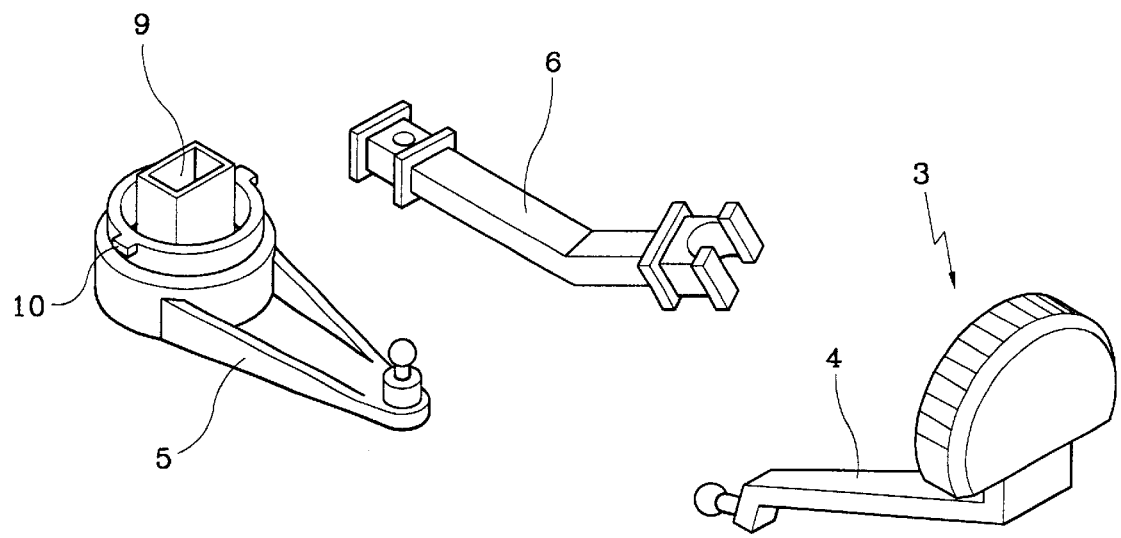
FIG. 3 is an analyzed perspective view for illustrating operations of the damping means shown in FIG. 1.

FIGS. 1, 2 and 3 are front view, plane and cross-sectional view and analyzed perspective view for respectively illustrating an air vent system for a door of an automobile in accordance with the present invention. The air vent system includes a damper 1 arranged in the center of the door duct for opening and closing the door duct 52 at the time of its rotation, a damper knob 3 coupled with a rotary axis 2 at an edge of the door duct to be rotated, and link means 3 connecting damper 1 and damper knob 3 which is rotated to allow the damper 1 to open and close the door duct.52.

At this time, the link means includes a first link 4 extended from the damper knob 3, a second link 5 connected with the damper 1 by coupling means to be continuously rotated with the damper 1 and rotatably supported with the door duct 52 and a third link 6 connecting the first and second links 4, 5 to transform rotations of the damper knob 3 into those of the second link 5.

In other words, the damper knob 3 is rotated in the center of the rotary axis 2, the damper 1 is also rotated by movements of the first, second and third links 4, 5, 6 to open and close the door duct 52.

Figure 4:
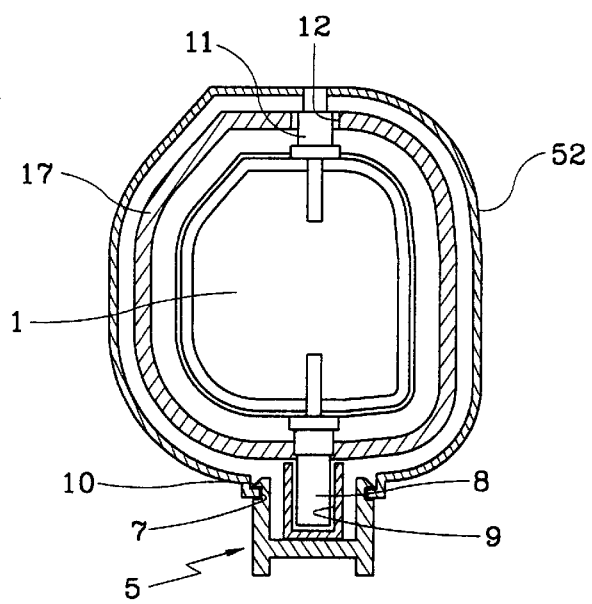
FIG. 4 is a cross-sectional view for illustrating a part cut along line A—A shown in FIG. 1.

As shown in FIG. 4, the coupling means includes a coupling hole 7 formed under the damper 1 of the door duct 52, an angular coupling pin 8 installed under the damper 1, a coupling groove 9 formed at the second link 5 to allow the coupling pin 8 to be inserted through the coupling hole 7, and a wedge-shaped hitching jaw 10 formed at the second link 5 for rotations and fixation of the second link 5 by insertion into the coupling hole 7.

In addition, a rotary axis 11 is formed at the upper edge of the damper 1 to keep its rotations, and a rotational hole 12 is formed at the door duct 52 for insertion of the rotary axis 11.

Figure 5:
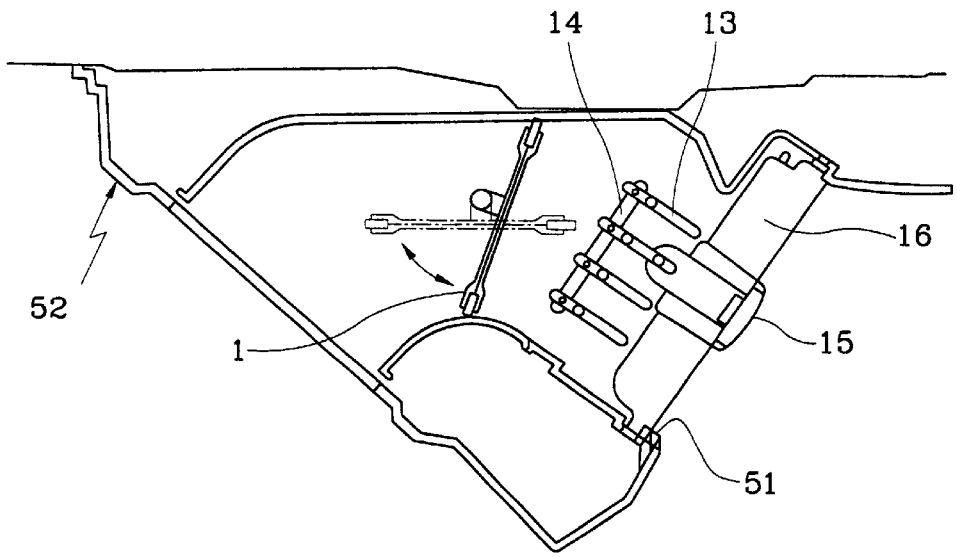
FIG. 5 is a plane and cross-sectional view for illustrating installation of vent blades with the damping means shown in FIG. 1.
Figure 6:
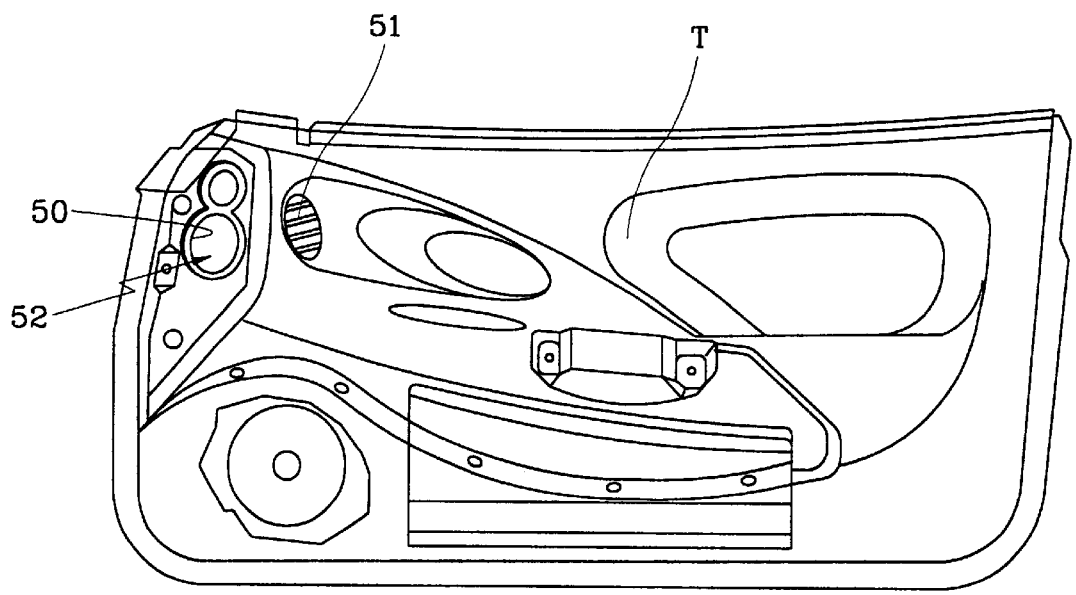
FIG. 6 is a front view for illustrating installation of an air vent at a door of a general automobile.

At this time, control means is installed in the front side of the damper to control an air exhausting direction through the door duct 52. As shown in FIG. 5, the control means includes a plurality of vertical blades 13 rotatably arranged at the outlet 51 of the door duct 52, a connector 14 to connect all of the vertical blades 13, a knob 15 inserted and coupled with one of the vertical blades 13, and a plurality of horizontal blades 16 supporting for horizontal movement of the knob 15 and horizontally rotatably coupled at the door duct 52 for horizontal rotations.

Particularly, an elastic pad 17 is included at the external periphery of the damper 1 to improve the effectiveness of completely blocking the door duct 52.

Figure 7:
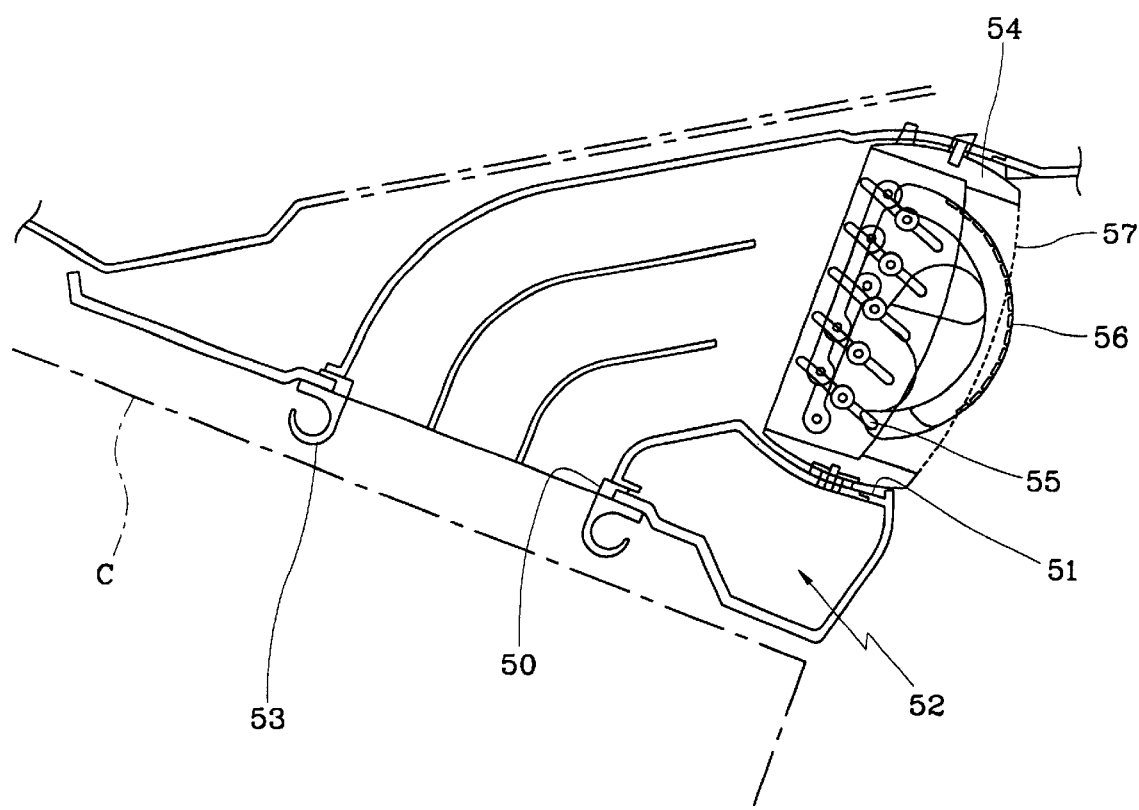
FIG. 7 is a cross-sectional view for illustrating a part cut along line B—B shown in FIG. 6.

It should be for granted that the conventional control means shown in FIG. 7 can accomplish the same effect.

Now, operational effects of the present invention will be described below. The damper 1 is inserted into the door duct 52 and the rotary axis 11 is inserted into the rotational hole 12.

If the rotary axis 11 is inserted into the rotational hole 12, the coupling pin 8 is positioned at the coupling hole 7. The coupling pin 8 is inserted into the coupling groove 9 of the second link 5 and the hitching jaw 10 is pressed into the coupling opening 7 to thereby fix the second link 5.

At this time, if the hitching jaw 10 is held at the coupling hole 7, the second link 5 is rotatably fixed to its position.

After the second link 5 is fixed, the rotary axis 2 of the damper knob 3 is rotatably coupled to a front surface of the door duct 52 and the first and second links 4, 5 are coupled with the third link 6.

If the first and second links 4, 5, 6 are coupled, it becomes possible to start operations of the damper 1. The vertical and horizontal blades 13, 16 are mounted in the front side of the damper 1. Then, the knob 15 is coupled with the horizontal blades 16 and connected with the vertical blades 13, so as to complete installation of an air vent system at the door of an automobile.

When the air vent system of a door thus constructed is operated, the knob 15 is horizontally and vertically rotated. Thus, air exhausting directions are controlled by rotations of the coupled vertical and horizontal blades 13, 16.

At this time, if the damper knob 3 is rotated to shut off the door duct 52, the first, second and third links 4, 5, 6 connected with the damper knob 3 are firstly rotated and the damper 1 is sequentially rotated with the second link 5.

For instance, if the damper knob 3 is rotated in the clockwise direction, the second and third links 5, 6 are moved to the left to enable the damper 1 to rotate at the state shown in FIG. 2, thereby blocking the door duct 52. When the door duct 52 is blocked with the damper 1, air is not to be supplied toward the control means. Therefore, a passenger can avoid undesired exposure to air.

In addition, if the damper knob 3 is rotated in the counterclockwise direction, the damper 1 is rotated to the clockwise direction to open the door duct 52.

As described above, there is an advantage in the air vent system for a door of an automobile in that damper is installed to open and close the door duct formed at the door, and the first, second and third links and the damper knob are mounted to control the damper 1, so that a passenger may close the door duct to avoid undesired exposure to air.

What is claimed is:

1. An air vent system for a door of an automobile having a door duct installed at a door with an inlet that is to be tightly aligned to a duct of a crush pad when the door is closed and an outlet formed to a predetermined direction of the door and control means installed in a front side of the door duct to control an air exhausting direction, the system comprising:

a damper arranged in the center of the door duct for opening and closing the door duct at the time of its rotations;

a damper knob coupled with a rotary axis at an edge of the door duct to be rotated; and link means connecting the damper and the damper knob which is rotated to allow the damper to open and close the door duct.

2. The system, as defined in claim 1, wherein the link means includes a first link extended from the damper knob; a second link connected with the damper by coupling means to be continuously rotated with the damper and rotatably supported with the door duct; and a third link connecting the first and second links to transform rotations of the damper knob into those of the second link.

3. The system, as defined in claim 1, wherein the coupling means includes a coupling hole formed under the damper of the door duct; an angular coupling pin installed under the damper; a coupling groove formed at the second link to allow the coupling pin to be inserted through the coupling hole; and a wedge-shaped hitching jaw formed at the second link for rotations and fixation of the second link by insertion into the coupling hole.

4. The system, as defined in claim 1 or 3, wherein an elastic pad is included at the external periphery of the damper to improve the effectiveness of tightly blocking the door duct.

* * * * *